United States Patent [19]
Priestley

[11] 3,878,272
[45]* Apr. 15, 1975

[54] GAS-LIQUID CONTACT APPARATUS

[75] Inventor: Ronald Priestley, Birmingham, England

[73] Assignee: Mass Transfer Limited, Westmoreland, England

[ * ] Notice: The portion of the term of this patent subsequent to Dec. 5, 1989, has been disclaimed.

[22] Filed: Apr. 16, 1973

[21] Appl. No.: 351,508

[30] Foreign Application Priority Data
Apr. 14, 1972 United Kingdom............... 17433/72

[52] U.S. Cl. .................. 261/112; 55/241; 161/135
[51] Int. Cl............................................ B01f 3/04
[58] Field of Search ..... 261/112; 165/177; 138/121, 138/173, 38; 55/241; 161/135, 137; 52/618

[56] References Cited
UNITED STATES PATENTS

| | | | |
|---|---|---|---|
| 1,481,709 | 1/1924 | Hauf............................... | 165/177 X |
| 3,211,219 | 10/1965 | Rosenblad ...................... | 261/112 X |
| 3,281,307 | 10/1966 | Moeller et al. .................. | 261/112 X |
| 3,466,019 | 9/1969 | Priestley .......................... | 261/112 |
| 3,525,391 | 8/1970 | Day.................................. | 261/112 X |
| 3,540,702 | 11/1970 | Uyama............................. | 261/112 |
| 3,704,869 | 12/1972 | Priestley ......................... | 261/112 |
| 3,762,468 | 10/1973 | Newson et al. .................. | 165/177 |

FOREIGN PATENTS OR APPLICATIONS

| | | | |
|---|---|---|---|
| 741,202 | 8/1966 | Canada............................. | 165/177 |
| 701,760 | 3/1931 | France.............................. | 165/177 |

Primary Examiner—Frank W. Lutter
Assistant Examiner—Richard L. Chiesa
Attorney, Agent, or Firm—Wigman & Cohen

[57] ABSTRACT

A packing sheet for use in apparatus in which a film of liquid is caused to flow in contact with a gas comprises a number of spaced parallel portions each of which is shaped as a sector of a hollow corrugated tube the peaks and valleys of which occur successively around the circumference of the tube, the said portions being connected by substantially planar portions of said sheet. The said sector preferably has the general shape of an arc of a circle extending about 60°, 90°, 120° or 180° and the corrugation preferably has a zig-zag wave form and is formed of plastics material and has a dimpled surface.

The invention also concerns apparatus in which a film of liquid is caused to flow in contact with a gas in which the packing comprises an array of corrugated tubes formed from the above packing sheets. A modification of the invention relates to packing members for use in apparatus in which a film of liquid is caused to flow in contact with a gas. Each of the packing members comprises a hollow tubular member the periphery of which is divided into a number of arcuate regions, each of which regions has a portion shaped as a sector of a hollow corrugated tube in which the peaks and valleys occur successively around the circumference of the tube; and to apparatus packed with such packing members.

9 Claims, 17 Drawing Figures

GAS-LIQUID CONTACT APPARATUS

This invention relates to apparatus for use in effecting contact of a gas with a flowing liquid film. There are numerous industrial processes where this type of contact is desired, examples being those where it is desired to effect a heat transfer between the liquid and the gas, as in cooling towers, those in which a gas is required to pick up vapours of a liquid, those in which a liquid is required to dissolve a proportion of a gas, and those in which a liquid and a gas are required to react with one another chemically. Other examples are the fractionation of two or more components by distillation, biological oxidation processes such as the manufacture of vinegar, biological filitration processes used in the treatment of sewage and industrial effluent, and various other effluent, sewage and liquid waste treatment processes.

Various types of packing for vessels in which such contact is to be effected are known; the packing may take the form of a stack of sheets of material over which sheets the liquid flows while the gas (which term is to be understood to include vapours and mixtures of gases and vapours) passes between adjacent sheets in the stack. In such cases, there is a tendency for the sheets to bow and flutter, especially if the rate of gas transmission between them is high, and if they are made of a fairly flexible material (e.g., sheet plastics material). Such movement of the sheets is often undesirable, both in terms of the efficiency of the gas/liquid contact obtained and in terms of the mechanical requirements of the system.

According to the present invention there is provided a packing sheet for use in apparatus is which a film of liquid is caused to flow in contact with a gas, the sheet comprising a number of spaced parallel portions each of which is shaped as a sector of a hollow corrugated tube, the said portions being connected by substantially planar portions of said sheet.

The cross section of the portion in a plane transverse to the direction of the portion is preferably an arc of a circle, oval, ellipse orother closed regular curve, though it may be a portion of a polygon having at least three sides. Particularly preferred constructions are those in which the said cross section has the general shape of an arc of a circle extending about 60°, 90°, 120°, or (most preferably) 180°. In these cases, a number of packing sheets may be assembled in such a fashion that the set of assembled packing sheets constitutes a regular array of hollow currugated tubes.

The corrugation of the walls of the tubes may take a very wide variety of forms. In section, the corrugation may be of sine wave, zig-zag or triangular wave form, or a scalloped shape or of any other wave form, regular or irregular. Corrugations may run around the tube (i.e., have peaks and valleys occurring successively around the circumference of the tube), or may take a helical form. If the tube is sectioned in certain planes, for example longitudinally or transversely, the section line may be straight or curved in certain cases. Thus, a tube having purely axial ridges and valleys forming corrugations will have a cross section of two parallel lines, while a tube having corrugations of a type in which the peaks and valleys occur successively along the length of the tube may, for example, have a circular or oval cross section. The tube may have one or more types of currugation disposed in its walls, and these may be separate or they may overlap.

A particular type of corrugation has a wall section consisting of consecutive curved portions, the junctions between the curved portions including a ridge. The curved portions may be directly adjacent or separated by lining portions, which joint the curved portions at an angle(i.e., in three dimensions the corrugation presents a ridge at that point). A particularly preferred wall section is that of consecutively oppositiely curved portions, each linked to the next via a short linking portion.

According to a particular feature of the invention there is provided a packing sheet for use in apparatus in which a film of liquid is caused to flow in contact with a gas, the sheet comprising a plurality of strips, the cross section of each said strip in a plane transverse thereto being similarly oriented and including a generally convex or concave portion, these portions being corrugated.

The shape of the sheet may be such that a plurality of sheets may be assembled or one sheet may be folded in such a way that the corrugated convex or concave portions form corrugated tubes. The corrugations in each tube may match as between the portions which form the tubes so that between adjacent portions the corrugations may be in phase or out of phase to any desired degree. By arranging the relative phase of the corrugation in adjacent portions it is possible to maintain the cross sectional area of the tube in plane transverse to the axis thereof, substantially constant.

In use, an assembly of sheets according to the invention is placed with the tubes vertical or substantially so and liquid allowed to fall over the inner and/or the outer faces of the column while gas passes up between and/or through them. The corrugations of the tubes serve to ensure efficient gas/liquid contact and thorough mixing of the liquid stream. The pressure drop of the gas flowing through the array may be maintained very low if the cross sectional area of each tube or column and that of the interspaces also, is maintained substantially constant.

In some cases it is desirable to provide groups of columns, e.g., 4 or 6 such columns, the groups being arranged in a desired regular array, e.g., on a square grid.

The margins of the individual packing sheets may be adapted to aid in fixing the sheets in position, for example by having deformations adapted to engage on a suitable framework, and the sheets may also be provided, either at their margins or at the portions intermediate the strips, with deformations to aid in registering the sheets one with another to consolidate a packing unit made up from such sheets.

The sheets may be assembled by self-interlocking tabs and slots, by welding them or adhering them together, by the use of suitable clips or by any other convenient means.

A particularly simple but valuable interlocking means may be used when the sheets are formed of, for example, sheet thermoplastics material. This consists of a plurality of holes and a plurality of raised generally cylindrical folded or assembled, pass through the holes to consolidate the assembled structure. In certain applications, there is no need to go to great lengths to secure a very firm engagement between holes and bosses in a press fit may be sufficient. In certain applications such as water cooling, however, where gas flow through and gas pressure drop across the packing may be very critical, it is undesirable to have ups banding bosses which tend to disturb gas flow. In such a case, the bosses may be deformed flat, e.g., with a hot iron, and this has the additional advantages of further strengthening the fixing.

The sheets are preferably made of thin sheet plastics materials, most preferably sheet thermoplastic materials. However, sheet metal may also be used. The surface of the material of the tubular members may advantageously be dimpled in order to aid the distribution of the liquid. The dimension of such dimpling is, of course, small with respect to the size of the curvature of the tubes and the corrugations therein. The dimpling is preferably constituted by a large number of adjacent small depressions on the surface of the material from which the tubular member is made. The preferred manufacturing method is by blow moulding, though other methods such as rotational casting and spiral welding may also be employed. In blow moulding, a parison or preform of hot plastics material is blown out against the wall of a mould of the desired shape; the mould is made up of a number of sections which then part to allow the formed tubular member to be extracted.

The packing sheets of the present invention provide packings for gas/liquid contact apparatus and for gas/liquid contact generally which have great stability and resistance to flutter and other undesirable movement, which are light in weight yet strong, and which may be easily and cheaply produced. In addition, by careful choice of the configuration of the surface of the tubes it is possible to achieve a packing through which gas can flow very easily, i.e., with only a small pressure drop.

In the use of the packing sheets of the present invention, as noted above, the sheets are assembled to present a packing consisting of an array of tubes, linked together in some cases by linking webs, down the surfaces of which liquid can flow. In use, these columns are generally arranged vertically or substantially vertically. The gas may flow concurrent or countercurrent to the flow of liquid.

As noted above, the sheets may be assembled so that the tube sections form an array of tubes. It is also possible to form an array of corrugated tubes useful for gas/liquid contact from tubes of a certain type, and accordingly the present invention further provides packing members, for use in apparatus in which a film of liquid is caused to flow in contact with a gas, which each comprise a hollow tubular member, the periphery of which is divided into a number of arcuate regions, each region of which has a portion shaped as a sector of a hollow corrugated tube. The corrugation may be of any type and in any direction as explained above. Preferably, the axis of the tube is parallel to the axis of the tubular member, though the axis of the tube may, for example, be in the form of a helix about the axis of the tubular member.

The cross section of the shaped portion of the tube in a plane transverse to the direction of the tubular member is preferably generally an arc of a circle, oval, ellipse or other closed regular curve, though it may be a portion of a polygon having at least several sides. Particularly preferred constructions are those in which the said cross section is generally an arc of a circle extending about 60°, 90°, 120°, or most preferably 180°. Depending on the arc selected a number of such tubular members may be assembled in various ways to give a regular array of hollow corrugated tubes.

The tube sectors may project outwardly or inwardly with respect to the hollow tubular member itself.

The invention is illustrated, by way of example, with reference to the accompanying drawings in which.

Figure 1:
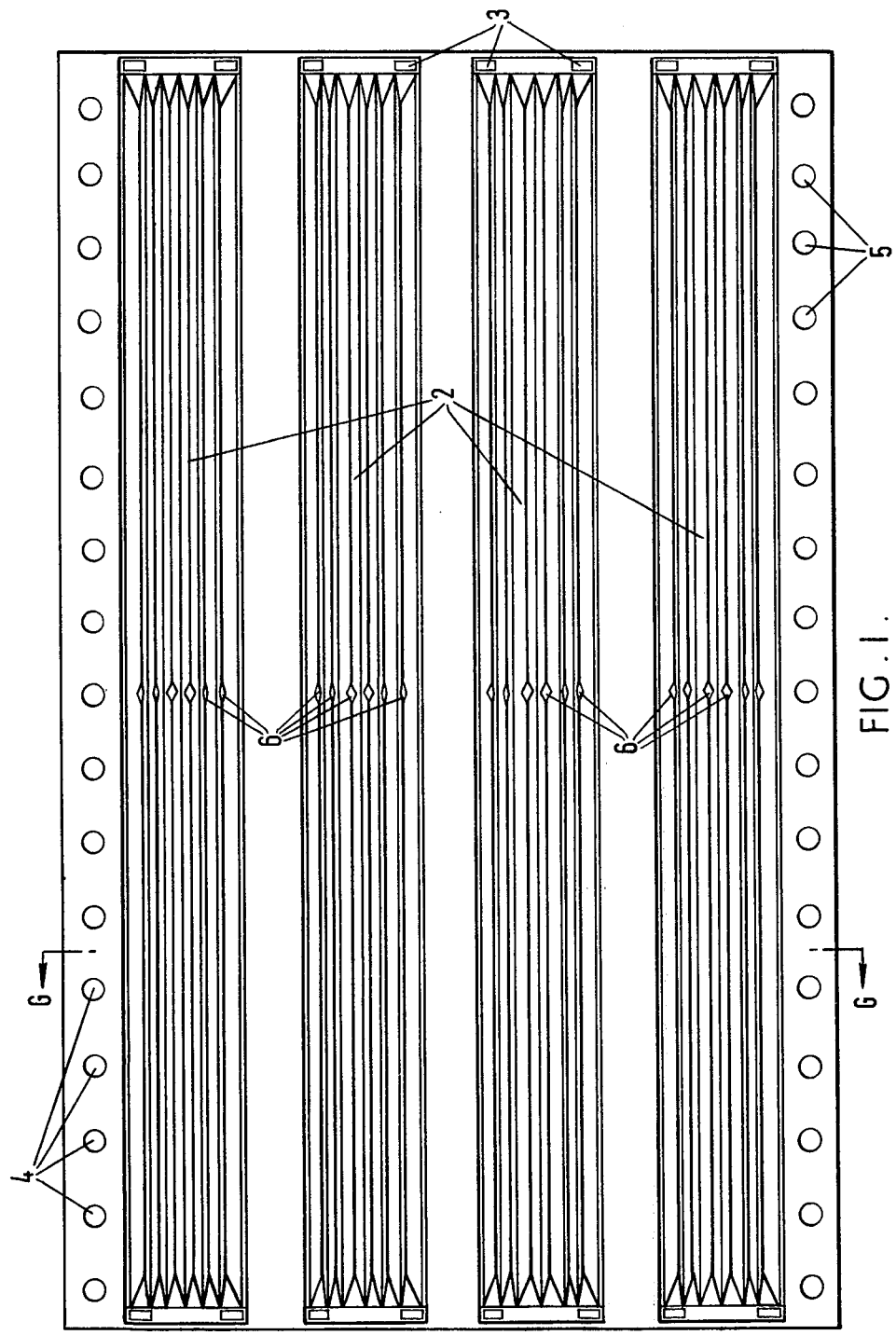
FIG. 1 is a plan view of a packing sheet according to the present invention.
Figure 2:
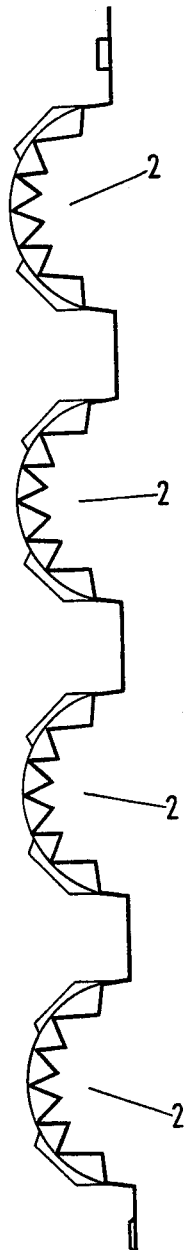
FIG. 2 is a section on G—G of FIG. 1.
Figure 3:
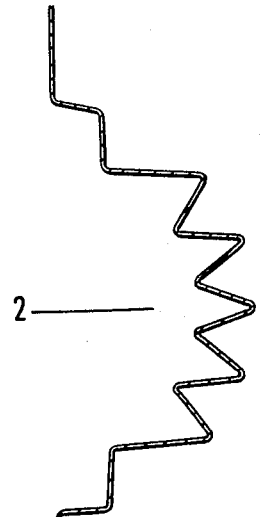
FIGS. 3–13 are various sections and details of the packing sheet of FIG. 1.
Figure 4:
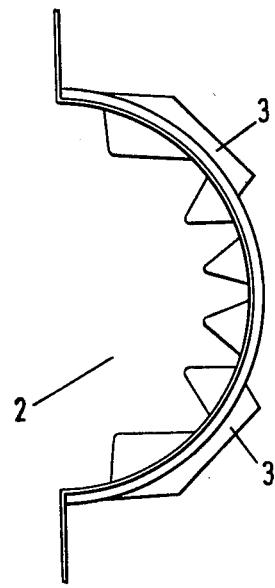
Figure 5:
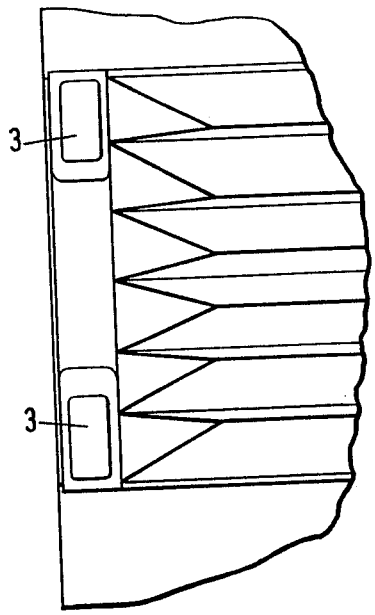
Figure 6:
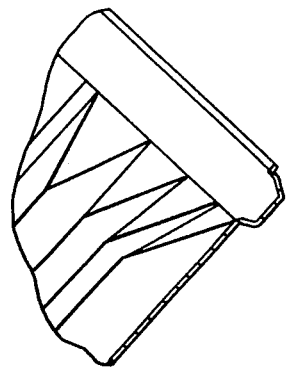
Figure 7:
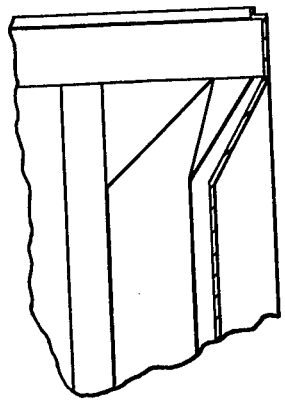
Figure 8:
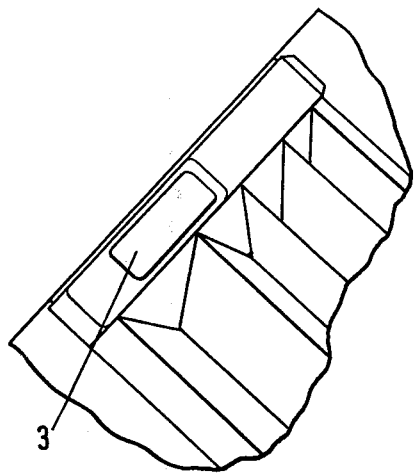
Figure 9:
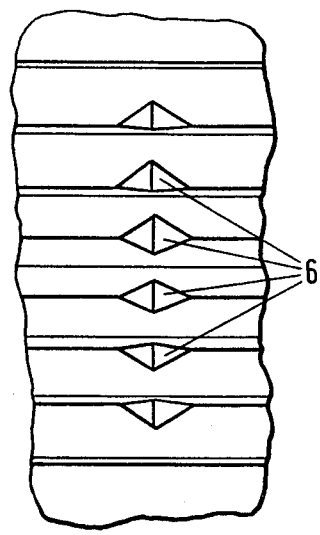
Figure 10:
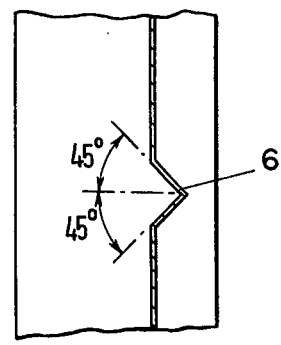
Figure 11:
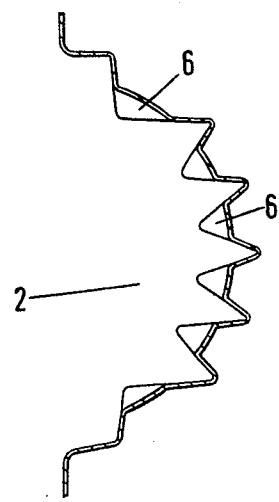
Figure 12:
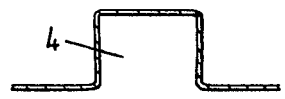
Figure 13:
Figure 14:
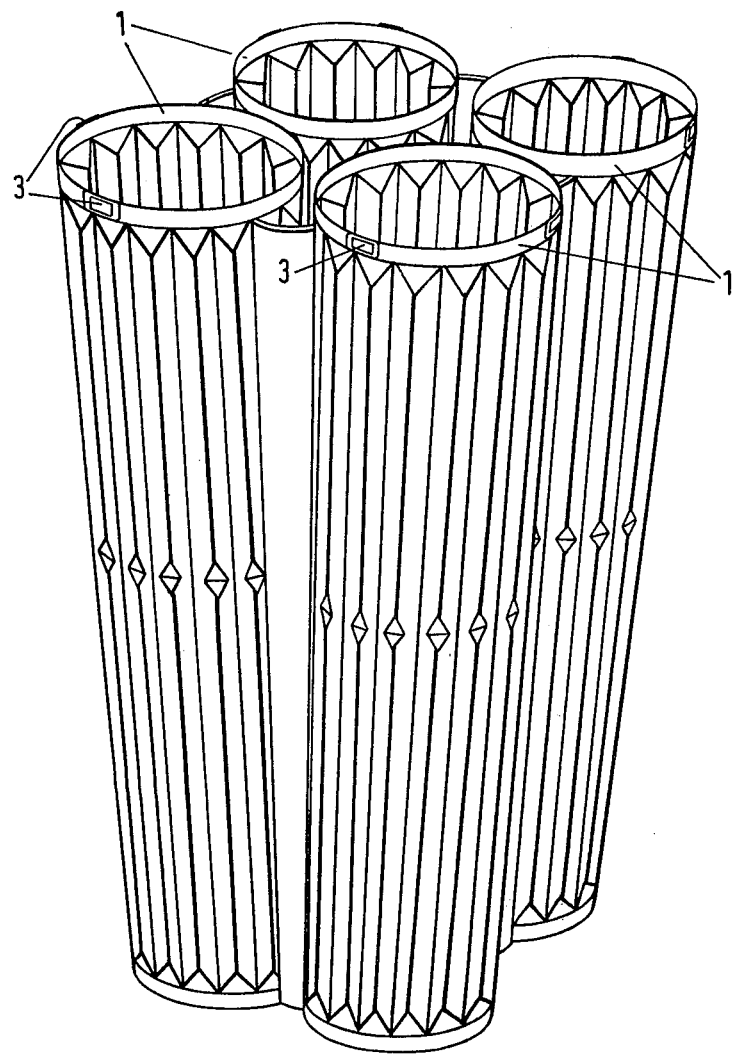
Figure 15:
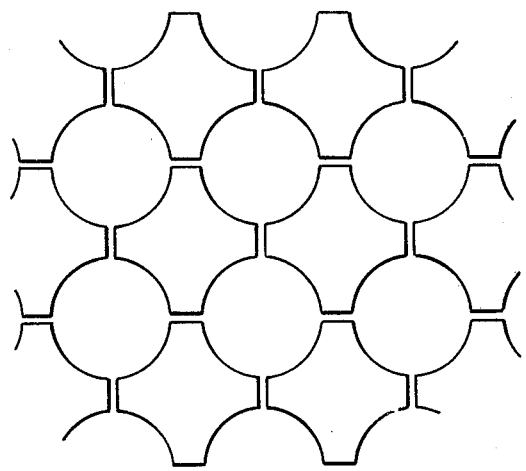
Figure 16:
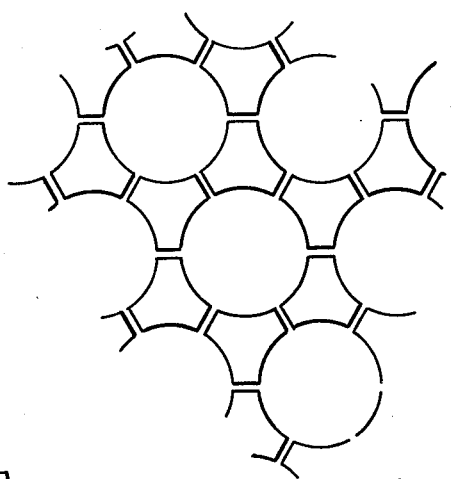
Figure 17:
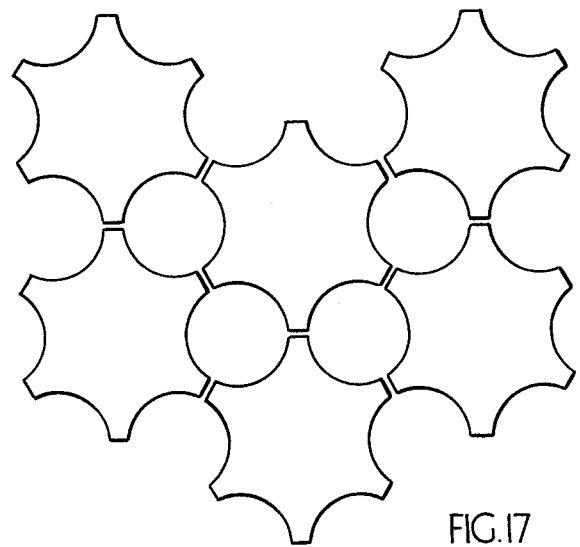

FIG. 14 is a perspective view of two packing sheets, of the type shown in FIGS. 1 to 12, folded to give a group of four tubes, and FIGS. 15, 16 and 17 are sectional views through arrays of tubes formed by assembling tube-type packing members according to the invention of the type described above. In FIGS. 15–17 only the general shape of the tubes has been indicated, i.e. the corrugations on the tubes have been omitted for clarity.

Referring to FIGS. 1–13, a packing sheet 1 has four half-tube sections 2, each of which is corrugated to give a series of vertical ribs. Each end of each tube section has fastening areas 3 and along the two sides are raised bosses 4 and dimpled holes 5.

Halfway along each tube are strengthening formations 6. More sets of like strengthening formations could be provided along the tube if desired.

The sheet is preferably formed from sheet thermoplastics material by vacuum moulding. Sheet thickness may be, for example, 0.02 inch.

In use the sheets are folded up, one one way and the other inside out, and one slid into the other, to form the structure shown in FIG. 14. In such structure, the inner sheet 1 may be made of thinner sheet material than the outer sheet 1 if desired.

If desired, in order to strengthen the structure and/or to allow the use of thinner material for sheets 1, a right hollow cylindrical member may be interposed between the two sheets 1 of the FIG. 14 assembly. This cylindrical member may be plain surfaced or corrugated and may be made, for example, of plastics, metal, asbestos cement or other suitable material. It may be perforate or imperforate.

I claim:

1. A packing sheet for use in apparatus in which a film of liquid is caused to flow in contact with a gas, the sheet comprising a number of discrete spaced parallel portions each of which is shaped as a sector of a hollow corrugated tube, of which the peaks and valleys of the corrugations occur successively around the circumference of the tube, and each of the said portions being connected by substantially planar portions of said sheet.

2. A packing sheet according to claim 1 in which the said sector has the general shape of an arc of a circle extending about an angle selected from 60°, 90°, 120° or 180°.

3. A packing sheet according to claim 1 in which the corrugation has a zig-zag wave form.

4. A packing sheet according to claim 1 formed of plastics material and having a dimpled surface.

5. Apparatus in which a film of liquid is caused to flow in contact with gas in which the packing comprises an array of corrugated tubes formed from packing sheets comprising a number of discrete spaced parallel portions each of which is shaped as a sector of a hollow corrugated tube, of which the peaks and valleys of the corrugations occur successively around the circumference of the tube, and each of the said portions being connected by substantially planar portions of said sheet.

6. Packing members for use in apparatus in which a film of liquid is caused to flow in contact with a gas which comprises a hollow tubular member the periphery of which is divided into a number of discrete arcuate regions, each of said regions having a portion shaped as a sector of a hollow corrugated tube, of which the peaks and valleys of the corrugations occur successively around the circumference of the tube, and wherein each of said portions are connected by generally planar non-corrugated portions of said tubular member.

7. A packing member according to claim 6 in which the sector takes the form of an arc of a circle extending about an angle selected from 60°, 90°, 120° or 180°.

8. A packing member according to claim 6 formed of plastics material and having a dimpled surface.

9. Apparatus in which a film of liquid is caused to flow in contact with a gas packed with an array of tubes formed by assembling packing members which each comprise a hollow tubular member the periphery of which is divided into a number of discrete arcuate regions, each of said regions having a portion shaped as a sector of a hollow corrugated tube of which the peaks and valleys of the corrugations occur successively around the circumference of the tube, and wherein each of said portions are connected by generally planar non-corrugated portions of said tubular member.

* * * * *